US010687996B2

(12) United States Patent
Costanza-Steady

(10) Patent No.: US 10,687,996 B2
(45) Date of Patent: Jun. 23, 2020

(54) CARRIER ASSEMBLY FOR A WHEELED MOBILITY DEVICE

(71) Applicant: Steady Enterprises, LLC., Madison, TN (US)

(72) Inventor: Sherry Holmes Costanza-Steady, Madison, TN (US)

(73) Assignee: Steady Enterprises, LLC, Madison, TN (US)

(*) Notice: Subject to any disclaimer, the term of this patent is extended or adjusted under 35 U.S.C. 154(b) by 0 days.

(21) Appl. No.: 16/438,568

(22) Filed: Jun. 12, 2019

(65) Prior Publication Data

US 2020/0022852 A1    Jan. 23, 2020

Related U.S. Application Data

(60) Provisional application No. 62/761,953, filed on Apr. 13, 2018.

(51) Int. Cl.
*A61G 3/00* (2006.01)
*A61G 3/08* (2006.01)
*B60R 9/06* (2006.01)
B60R 11/00 (2006.01)

(52) U.S. Cl.
CPC .......... *A61G 3/0808* (2013.01); *B60R 9/06* (2013.01); *B60R 2011/004* (2013.01); *B60R 2011/008* (2013.01); *B60R 2011/0071* (2013.01)

(58) Field of Classification Search
CPC ............. B60R 9/06; B60R 2011/004; B60R 2011/0071; B60R 2011/008; A61G 3/0808
See application file for complete search history.

(56) References Cited

U.S. PATENT DOCUMENTS

| 4,786,072 A | * | 11/1988 | Girvin | A61G 5/08 280/304.1 |
| 5,011,361 A | * | 4/1991 | Peterson | A61G 3/0209 224/497 |
| 5,137,411 A | * | 8/1992 | Eul | B60P 3/073 224/521 |
| 5,199,842 A | * | 4/1993 | Watt | A61G 3/0209 224/497 |
| 5,482,424 A | * | 1/1996 | Jones | A61G 3/0209 224/510 |
| 5,816,763 A | * | 10/1998 | Hamann | B60R 9/06 414/462 |
| 6,386,817 B1 | * | 5/2002 | Cash | A61G 3/0209 414/462 |
| 7,785,058 B2 | * | 8/2010 | Ray | B60R 9/065 224/527 |

(Continued)

Primary Examiner — Peter N Helvey
(74) Attorney, Agent, or Firm — Clements Bernard Walker; Richard A. Walker

(57) ABSTRACT

Carriers for carrying a wheelchair, wheeled mobility device, personal transporter, or the like, are provided. Also, hitch assemblies, which are connected to a vehicle and are used to support these associated carriers, are also provided. One implementation of a carrier for carrying a wheeled mobility device may include an attachment link configured to be connected to a vehicle. The carrier also includes a basket component fixedly connected to the attachment link and further includes an upper bracket. The basket component and the upper bracket, for example, may be configured to support the wheeled mobility device.

18 Claims, 5 Drawing Sheets

(56) References Cited

U.S. PATENT DOCUMENTS

| | | | |
|---|---|---|---|
| 7,798,760 B2* | 9/2010 | Strassman | B60P 1/4421 |
| | | | 414/462 |
| 8,596,508 B1 | 12/2013 | Steady | |
| 8,800,582 B2* | 8/2014 | Hooper | E04H 6/04 |
| | | | 135/120.4 |
| D713,776 S | 9/2014 | Steady | |
| 8,998,257 B2* | 4/2015 | Hebel | A61G 3/062 |
| | | | 224/495 |
| 9,403,473 B2* | 8/2016 | Soklaski | B60P 3/06 |
| RE46,253 E | 12/2016 | Costanza-Steady | |
| 2003/0057243 A1* | 3/2003 | Himel, Jr. | B60R 9/06 |
| | | | 224/519 |
| 2003/0165376 A1* | 9/2003 | Bruno | A61G 3/0209 |
| | | | 414/462 |
| 2005/0013682 A1* | 1/2005 | Pedrini | B60P 3/07 |
| | | | 414/462 |
| 2015/0367785 A1* | 12/2015 | Sanders | B60R 9/06 |
| | | | 224/519 |

\* cited by examiner

CARRIER ASSEMBLY FOR A WHEELED MOBILITY DEVICE

CROSS-REFERENCE TO RELATED APPLICATION

The present application claims the benefit of priority to U.S. Provisional Patent Application No. 62/761,953, filed Apr. 13, 2018, and entitled "Steady Wheelchair Carrier," the entire contents of which are incorporated by reference herein.

TECHNICAL FIELD

The present disclosure is generally directed to carrying and transporting devices. More particularly, the present disclosure relates to carrier devices configured to be attached to a vehicle for carrying wheelchairs and other wheeled mobility devices.

BACKGROUND

On any given day, millions of people in the United States will be using some type of mobility device or walking aid. The need for such devices may be based on a person's physical handicap or disability (e.g., osteoarthritis), may be based on overly long distances that a person may otherwise need to traverse on foot, may be based on age, or may be based on other mobility impairment issues. Although most mobility assistance devices include crutches, canes, and walkers, about a quarter of the mobility assistance devices used in the United States include some type of wheeled device, such as a wheelchair, wheeled walker, or other self-propelled or battery-propelled personal transporter.

Furthermore, many people with mobility issues are sufficiently capable of operating a vehicle, allowing them to drive to a certain destination and then venture to farther places using their mobility assistance device. This offers the person an opportunity to maintain an independent and active lifestyle.

One problem with many wheeled mobility devices, however, is that they can tend to be heavy and/or bulky. Therefore, some vehicles may be equipped with a wheelchair ramp, lift, or other device for helping the person move the wheelchair into the vehicle. However, this equipment can be rather expensive and is not particularly necessary for all users. For most vehicles, which do not have such equipment installed, it can be a problem for someone who already may have physical limitations to lift a wheelchair or other similar device into a trunk of a vehicle, onto a bed of a pickup truck, into a back seat area of a van or minivan, or into any other storage compartment of a vehicle.

Therefore, there is a need for a simple and easy-to-use carrier device that may be used to carry a personal wheeled mobility device (e.g., wheelchair) on a vehicle. There is also a need for a device that can be attached to the vehicle and that can reduce the amount of heavy lifting required by the user to place the wheeled mobility device onto the carrier.

SUMMARY

Accordingly, the present disclosure is directed to carriers and associated receiver hitch or trailer hitch assemblies, where the carriers are configured to hold a personal wheeled mobility device, such as a wheelchair or the like. In one embodiment, for example, a carrier configured to carry a wheeled mobility device is described in the present disclosure. The carrier in this embodiment includes an attachment link configured to be connected to a vehicle, a basket component fixedly connected to the attachment link, and an upper bracket. The basket component and the upper bracket are configured to support the wheeled mobility device.

In accordance with another embodiment, a carrier assembly is described in the present disclosure. The carrier assembly may include, for example, a receiver or receiving hitch including at least a receiving slot. The receiver in some cases may already be securely mounted to a vehicle. The carrier assembly further includes a carrier configured to hold a wheeled mobility device when the vehicle is in motion. The carrier in this embodiment includes an attachment link including at least a metal bar, where the metal bar is configured to be inserted in the receiving slot of the receiver to connect the attachment link to the receiver. The carrier also includes a basket component fixedly connected to the attachment link and an upper bracket. The basket component and upper bracket are configured to support the wheeled mobility device when the wheeled mobility device is in a collapsed state.

BRIEF DESCRIPTION OF THE DRAWINGS

The present disclosure is directed to various embodiments illustrated and described herein with reference to the various drawings, in which like reference numbers are used to denote like system or assembly components/methods or algorithm steps. The illustrated components of the various systems are not necessarily drawn to scale.

DESCRIPTION OF EMBODIMENTS

According to the present disclosure, various embodiments of carriers and related vehicle receiver hitch assemblies are described. The carrier, in particular, may be used to carry or hold a wheelchair or other similar type of mobility assistance device in place when the vehicle is in motion. Thus, when the carrier is installed on a vehicle, a user may easily position his/her wheeled mobility device onto the carrier using less effort than what would otherwise be required to lift the wheeled mobility device into a trunk or other storage area of the vehicle. Once secured to the carrier, the wheeled mobility device can be transported to a new destination, where the user can then easily remove the wheeled mobility device from the carrier to be used for mobility assistance as needed.

Figure 1:
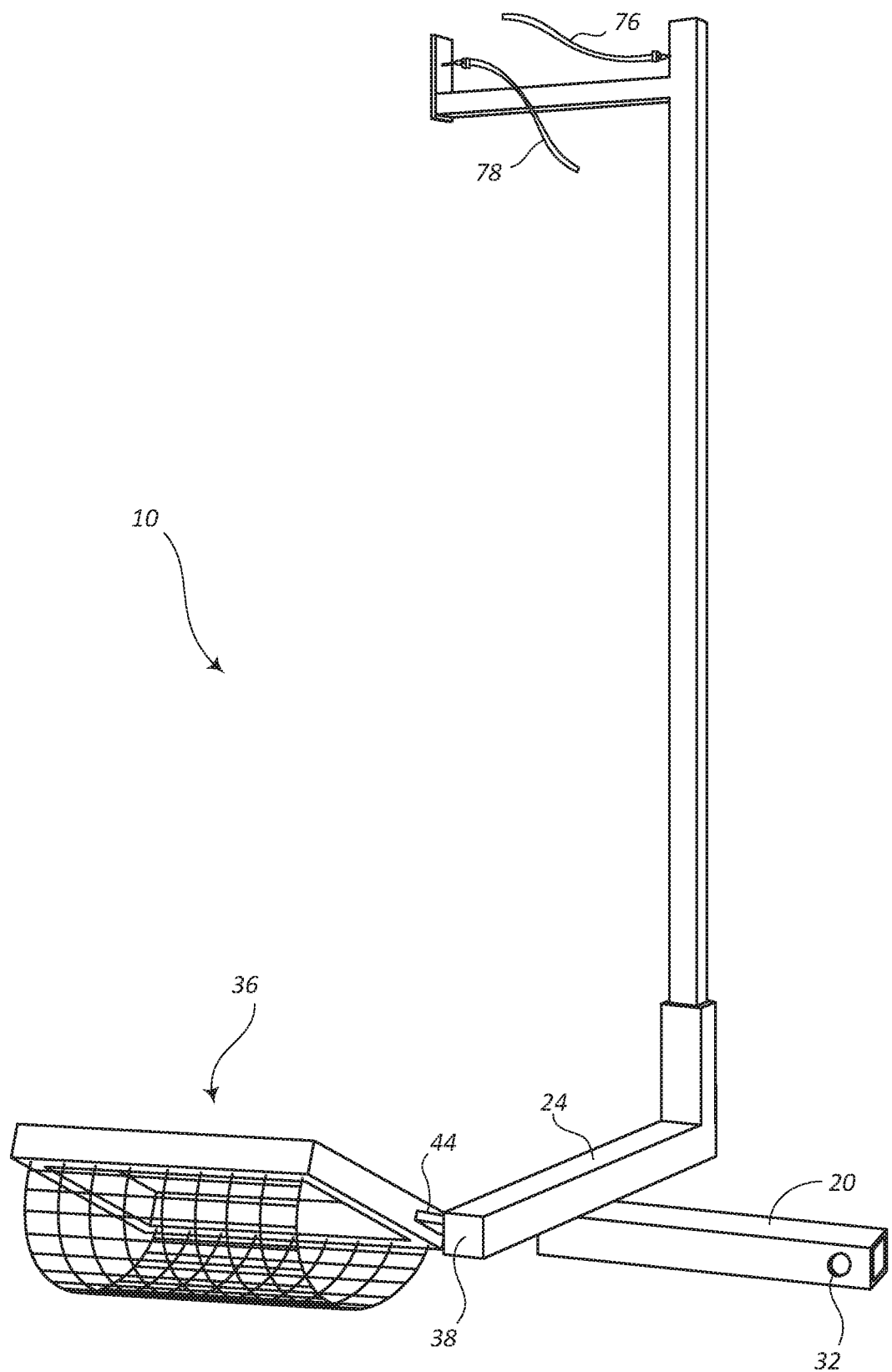
FIG. 1 is a diagram showing a perspective view of a carrier for carrying a wheeled mobility device, according to various embodiments of the present disclosure.

FIG. 1 illustrates a perspective view of an embodiment of a carrier 10 in its completed form. The carrier 10 is configured for carrying a wheeled mobility device (not shown in FIG. 1), which may include, for example, a wheelchair, wheeled walker, rollator, transport chair, transport device, or other types of personal transporters that have a side-to-side collapsible storage configuration. In particular, the wheeled mobility device may normally be used to assist a person with mobility (e.g., walking) issues. In its constructed form, the carrier 10 may have a weight of about 15 pounds, which allows the carrier 10 to be easily installed on the back of a vehicle.

The carrier 10 may be attached to a receiver or receiver hitch of a vehicle. According to additional embodiments, a vehicle may have one or more receiver hitch assemblies or trailer hitches installed thereon. The receiver or receiver hitches may be a type of trailer hitch having multiple receiving ports or receiving tubes, which may be configured to support multiple carriers 10. In this respect, any number of carriers 10 may be installed on a vehicle for carrying any number of wheeled mobility devices.

Also, the carrier 10 is configured for attachment to the outside of the vehicle. As such, the wheeled mobility device can be transported without occupying a large amount of trunk space or interior space of the vehicle. Normally, the carrier 10 does not prevent a user from accessing the trunk of the vehicle. Nevertheless, the carrier 10 can be easily disconnected from a receiver or hitch assembly of the parked vehicle if necessary. If the carrier 10 is disconnected from the receiver, the carrier 10 can be re-connected to the receiver at a later time (e.g., after placing large objects in the trunk) and the wheeled mobility device can then be mounted onto the carrier 10.

Figure 2:
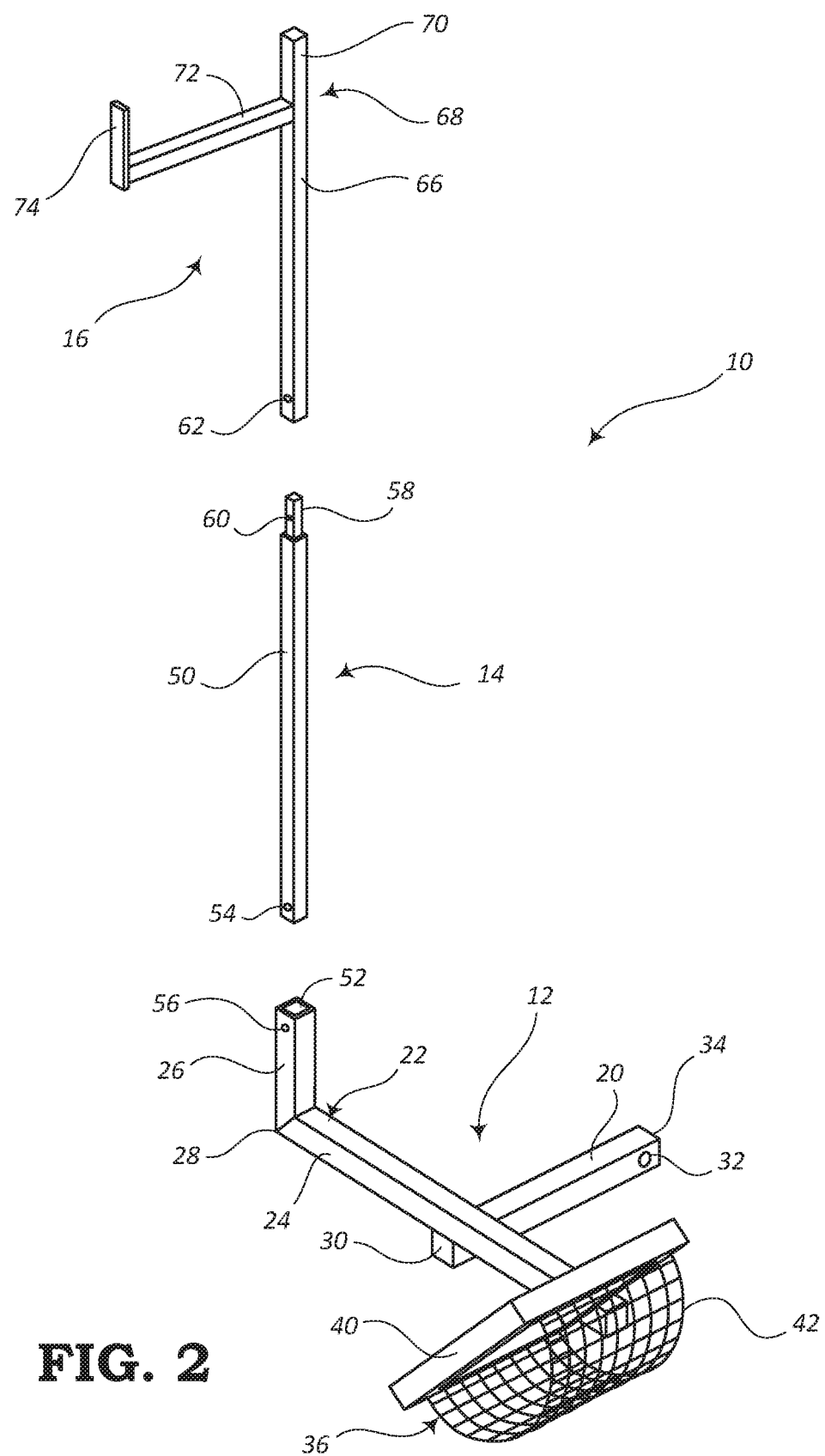
FIG. 2 is a diagram showing an exploded view of the sections of the carrier of FIG. 1, according to various embodiments.
Figures 3, 4:
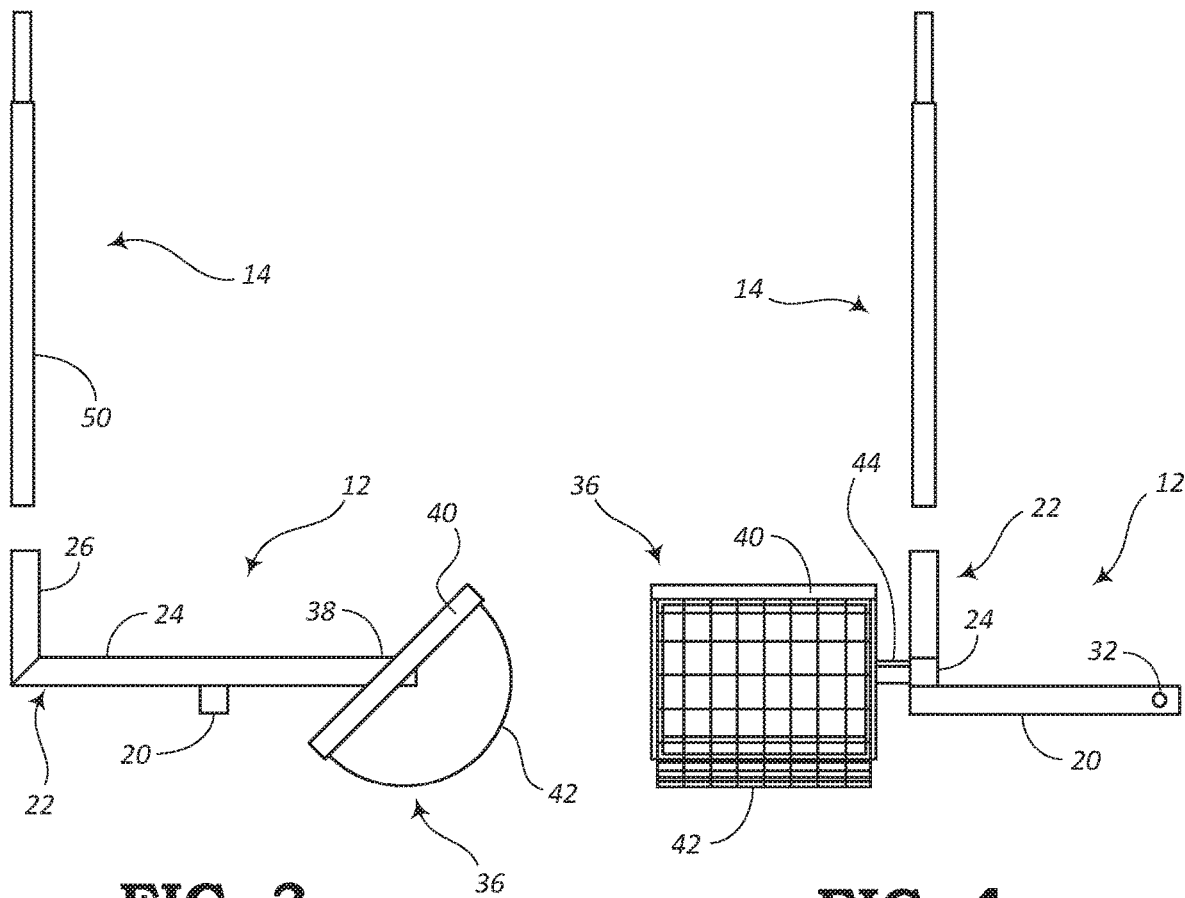
FIG. 3 is a diagram showing an exploded view from a rear perspective of the carrier of FIG. 1.
FIG. 4 is a diagram showing an exploded view from a side perspective of the carrier of FIG. 1.

FIG. 2 illustrates an exploded perspective view of the sections of the carrier 10. Also, FIG. 3 is a diagram showing an exploded back view of the carrier 10 and FIG. 4 is a diagram showing an exploded side view of the carrier of FIG. 1. The sections of the carrier 10 shown in FIGS. 2-4 can be connected together using any suitable type of connectors (e.g., nuts, bolts, washers, screws, pins, clips, etc.) to form the structure in its usable form as shown in FIG. 1. When not in use or during shipping, the sections of the carrier 10 may be separated or disconnected.

The carrier 10 is configured to be connected to a receiver hitch assembly (not shown in FIGS. 1-4) on the outside of a vehicle (not shown in FIGS. 1-4). Once installed, the carrier 10 can then be used to securely support the wheeled mobility device when the user of the wheeled mobility device is travelling in the vehicle. Then, when the vehicle reaches a certain destination where the user may need to use the wheeled mobility device, the wheeled mobility device can be easily taken off the carrier 10. The following description may reference various components that are shown in one or more of FIGS. 1-4.

According to some embodiments, the carrier 10 includes a lower section 12, a middle section 14, and a top section 16, as shown in FIGS. 2-4. Suitable hardware may be used to connect the three sections 12, 14, 16 together to form the completed carrier 10, as shown in FIG. 1. The hardware may include nuts (e.g., lock nuts, wing nuts, etc.), bolts, screws, linchpins or other types of pins, R-clips or other types of clips, and/or other suitable types of connection elements.

In some embodiments, the lower section 12 may include an attachment link 20 and a base component 22, where the base component 22 may include a horizontal part 24 and a vertical part 26. The vertical part 26 may be welded to a first end 28 of the horizontal part 24. In some embodiments, the connecting ends of the vertical part 26 and horizontal part 24 may be angled at 45 degrees and welded together. The horizontal part 24 of the base component 22 may be positioned on top of a first end 30 of the attachment link 20 and may be welded to the attachment link 20 to thereby form a T-shaped structure. An end cap may be attached to the first end 30 of the attachment link 20. An opening 32 may extend through the attachment link 20 at a second end 34 thereof. The opening 32 may be used for allowing the carrier 10 to be connected to a receiver of a trailer hitch.

The lower section 12 may be further configured to include a basket component 36 that is attached to a second end 38 of the horizontal part 24 of the base component 22. An end cap may be placed on the second end 38 of the horizontal part 24. The basket component 36 may be tilted by a certain angle (e.g., about 45 degrees) to allow the user to more easily place the front wheels of the wheeled mobility device in the basket component 36 when the wheeled mobility device is being loaded onto the carrier 10 and to allow the user to more easily remove the wheeled mobility device from the carrier 10 when being unloaded. The basket component 36 includes a frame 40 and a mesh component 42. The mesh component 42 is connected at one end to a top portion of the frame 40 and connected at its opposite end to a bottom portion of the frame 40. The lower section 12 further comprises a connection member 44 (FIG. 4) for connecting the frame 40 of the basket component 36 to the second end 38 of the horizontal part 24 of the base component 22.

The middle section 14 of the carrier 10, according to the illustrated embodiment, includes a vertical beam 50. A lower end of the vertical beam 50 is configured to be inserted into an opening 52 at a top end of the vertical part 26 to connect the middle section 14 with the lower section 12. An opening 54 may be formed through the vertical beam 50 near the bottom of the vertical beam 50. The opening 54 may be aligned with a corresponding opening 56 in the top portion of the vertical part 26 of the lower section 12. When aligned, suitable hardware (e.g., nuts, bolts, screws, etc.) may be inserted through the openings 54, 56 for secure connection.

An upper end of the vertical beam 50 of the middle section 14 may include an opening in which a connection insert 58 may be inserted. The connection insert 58 may be welded to the vertical beam 50. An opening 60 may be formed in the connection insert 58 for assisting the connection with the upper section 16.

The top section 16 of the carrier 10 includes a second vertical beam 66, which may be similar to the vertical beam 50 of the middle section 14. The top section 16 further includes a bracket 68, which may be used for supporting the handles or handlebars of the wheeled mobility device when it is positioned on the carrier 10. The bracket 68 may have a rectangular shape, as is shown in the drawings, or may include any other suitable shape (e.g., U-shaped, V-shaped, etc.). The bracket 68 includes a top section 70 of the vertical beam 66, a horizontal prop 72, and an end component 74. The horizontal prop 72 may be welded to the top section 70 of the vertical beam 66 and the end component 74 may be welded to the horizontal prop 72. An end cap may be attached to the end of the top section 70 of the vertical beam 66.

A first strap 76 may be attached to the top section 70 of the vertical beam 66 and a second strap 78 may be attached to the end component 74. The straps 76, 78 may be used to tie or hold down the handles or handlebars of the wheeled mobility device when it is positioned on the carrier 10. In some embodiments, the straps 76, 78 may include hook and loop elements (e.g., Velcro), buckles, or other suitable connection elements to assist in holding the wheeled mobility device.

As illustrated in FIG. 3, the carrier 10 is arranged such that the basket component 36 is positioned on the right side (i.e., corresponding with the right side of a vehicle) and the vertical beams 50, 66 of the middle and upper sections 14, 16, respectively, extend up from the vertical part 26 on the left side of the base component 22. However, in other embodiments, the carrier 10 as illustrated in FIGS. 1-4 may instead be reversed such that the basket component 36 is on the left side and the middle and upper sections 14, 16 extend up from the right side. Other configurations and arrangements of parts are contemplated, whereby the carrier 10 may be altered from the illustrated embodiments as may be understood by one or ordinary skill in the art without departing from the spirit and scope of the present disclosure.

Therefore, according to various embodiments, the carrier 10 may be configured to carry a wheeled mobility device and may include an attachment link (e.g., attachment link 20) configured to be connected to a vehicle. The carrier 10 may include a basket component (e.g., basket component 36) fixedly connected to the attachment link 20 (e.g., via the base component 22). Furthermore, the carrier 10 may include an upper bracket (e.g., bracket 68), whereby the basket component 36 and the upper bracket 68 are configured to support a wheeled mobility device.

Furthermore, the carrier 10 described above may further be configured such that the basket component 36 and the upper bracket 68 can support the wheeled mobility device when the wheeled mobility device is in a collapsed state. For example, the collapsed state may be defined as the wheeled mobility device being folded in a side-to-side manner such that the wheels on one side of the mobility device are brought close to the wheels on the other side. The basket component 36 may be configured to support a first set of wheels (e.g., front wheels) of the collapsed wheeled mobility device and the upper bracket 68 may be configured to support a set of handles or handlebars extend toward the back of the collapsed wheeled mobility device.

In addition, the base component 22 described above may include a horizontal part (e.g., horizontal part 24) fixedly connected to a vertical part (e.g., vertical part 26). The horizontal part 24 of the base component 22 may be fixedly connected between the attachment link 20 and the basket component 36. An upright post (e.g., vertical beams 50, 66) may be connected between the upper bracket 68 and the vertical part 26 of the base component 22. The upright post 50, 66 may include a lower section (e.g., middle section 14) connected to an upper section (e.g., upper section 16). The upper section 16 of the upright post, in some embodiments, may be adjustable with respect to the lower section 14 of the upright post. For example, according to some embodiments, the vertical beams 50, 66 may instead include telescoping elements, multiple sets of connection openings, or other features to allow the upper bracket 68 to be positioned at various heights above the vertical part 26 of the lower section 12. Thus, adjusting the upper section 16 with respect to the middle section 14 may result in an adjustment in the position of the upper bracket 68 with respect to the basket component 36. In this way, the carrier 10 can be adjusted to accommodate wheeled mobility devices of various sizes and shapes.

The upper bracket 68 may include a horizontal prop (e.g., horizontal prop 72) having a first end connected near a top end 70 of the upper section 16 of the upright post 50, 66 and an end component (e.g., end component 74) extending in a vertical direction from a second end of the horizontal prop 72. The upper bracket 68 may further include one or more straps (e.g., straps 76, 78) configured to hold a portion of the wheeled mobility device next to the horizontal prop 72.

The carrier 10 may be further configured such that the basket component 36 includes a metal frame (e.g., frame 40) and a curved mesh component 42. The curved mesh component 42 may have first and second ends connected to opposite sides of the metal frame 40. The metal frame 40, in some embodiments, may define a plane that is oriented at an acute angle with respect to a horizontal plane, such as one defined by the attachment link 20 or horizontal part 24 of the base component 22.

The carrier 10 may further comprise a metal connection element (e.g., connection member 44) fixedly connected between the horizontal part 24 and the metal frame 40 of the basket component 36. The attachment link 20 may include a metal beam and an opening (e.g., opening 32), wherein the metal beam of the attachment link 20 may be inserted in a receiving slot or receiving tube of a receiver or receiver hitch already mounted on the vehicle.

According to various embodiments, the vehicle may be a car, automobile, truck, van, minivan, sport utility vehicle (SUV), golf cart, scooter, or other transportation device for transporting one or more people on roads, streets, pathways, etc., and may be propelled by an internal combustion engine, batteries, hybrid engine, etc. In some cases, the vehicle may require the driver to own a license to operate the vehicle. Also, the wheeled mobility device may be a personal or individual transporter including a wheelchair, a wheeled walker, a transport chair, a rollator, a transport device, or other similar type of mobility assistance device, particular one having at least one set of wheels for assisting a person having walking or mobility issues and one that can be collapsed in a side-to-side direction.

The various components of the lower, middle, and upper sections 12, 14, 16 may be constructed from metal tubing, metal bars, etc. In some embodiments, the components may include metal, stainless steel, aluminum, or other suitable materials. The straps 76, 78 may include any suitable fabric material, such as nylon, and may further include metal snaps, hook and loop elements (e.g., Velcro), metal buckles, or other suitable connecting components. The connection hardware (e.g., nuts, bolts, screws, etc.) may be metal or stainless steel elements.

In some embodiments, the carrier 10 may be constructed with specific materials as described below. It should be noted, however, that the following dimensions and other specifications are merely exemplary and may be altered according to other various embodiments that may be understood by one of ordinary skill in the art having a clear understanding of the present disclosure.

For example, the attachment link 20 may comprise a 11-gauge square metal tube having a 1¼ inch outside diameter and may be about 12 inches long with a 9⁄16 inch opening 32 spaced about 1½ inches from the end of the attachment link 20. The attachment link 20 may be configured to fit in a square 1¼ inch by 1¼ inch receiving slot or receiving tube of a receiver hitch on the vehicle.

The horizontal part 24 of the base component 22 may comprise a 11-gauge square metal tube having a 1¼ inch outside diameter and may be about 18 inches long with an end 28 cut at a 45-degree angle. The vertical part 26 of the base component 22 may comprise a 9-gauge square metal tube having a 1¼ inch outside diameter and may be about 6 inches long with an end 28 cut at a 45-degree angle. The horizontal part 24 and vertical part 26 may be welded together.

The vertical beam 50 may comprise a 14-gauge square metal tube having a one inch outside diameter and may be about 18 inches long. The other vertical beam 66 making up the upright post may also comprise a 14-gauge square metal tube having a one inch outside diameter and may also be about 18 inches long. The connection insert 58 may comprise a 14-gauge square metal tube having a ¾ inch outside diameter and may be about 8 inches long. The connection insert 58 may be welded into the top end of the vertical beam 50 of the middle section 14 with about 4 inches protruding up from the top end of the vertical beam 50.

Regarding the upper bracket 68, the horizontal prop 72 may comprise a 14-gauge square metal tube having a one inch outside diameter and may be about 9 inches long. The horizontal prop 72 may be welded to the vertical beam 66 about 2 inches down from the top of the vertical beam 66. The end component 74 may comprise a one-inch flat metal bar having a thickness of about ⅜ inches and may be about 3 inches long. The end component 74 may be welded to the opposite end of the horizontal prop 72.

Regarding the basket component 36, the frame 40 may comprise a ⅜ inch thick flat metal bar having a width of about one inch and may be about 40 inches long. The metal bar of the frame 40 may then be bent into a 10 inch by 10 inch square. The mesh component 42 may include a metal wire mesh that is 9 inches wide by 17 inches long. The metal wire mesh may be curved and then welded to opposite sides of the frame 40. The connection member 44 may comprise a flat metal bar having a thickness of 2 inches and may have a width of 1½ inches and a length of 2½ inches. The connection member 44 may be welded at an angle between the horizontal part 24 and the frame 40.

The end caps at the ends of the component labelled 30, 38, 70 may comprise one-inch square plastic end caps. The hardware for connecting the various components together may include nuts, bolts, screws, pins, clips, etc. A ¼ inch by 1¼ inch by 20 blot and lock nut may be used to hold D-rings for the straps 76, 78. A linchpin ¼ inch by 1¾ inch may be used to hold the vertical beam 50 in the top end 52 of the vertical part 26 of the base component 22. The straps 76, 78 may each be 18 inch nylon web straps with about 6 inches of hook or loop elements.

Figure 5:
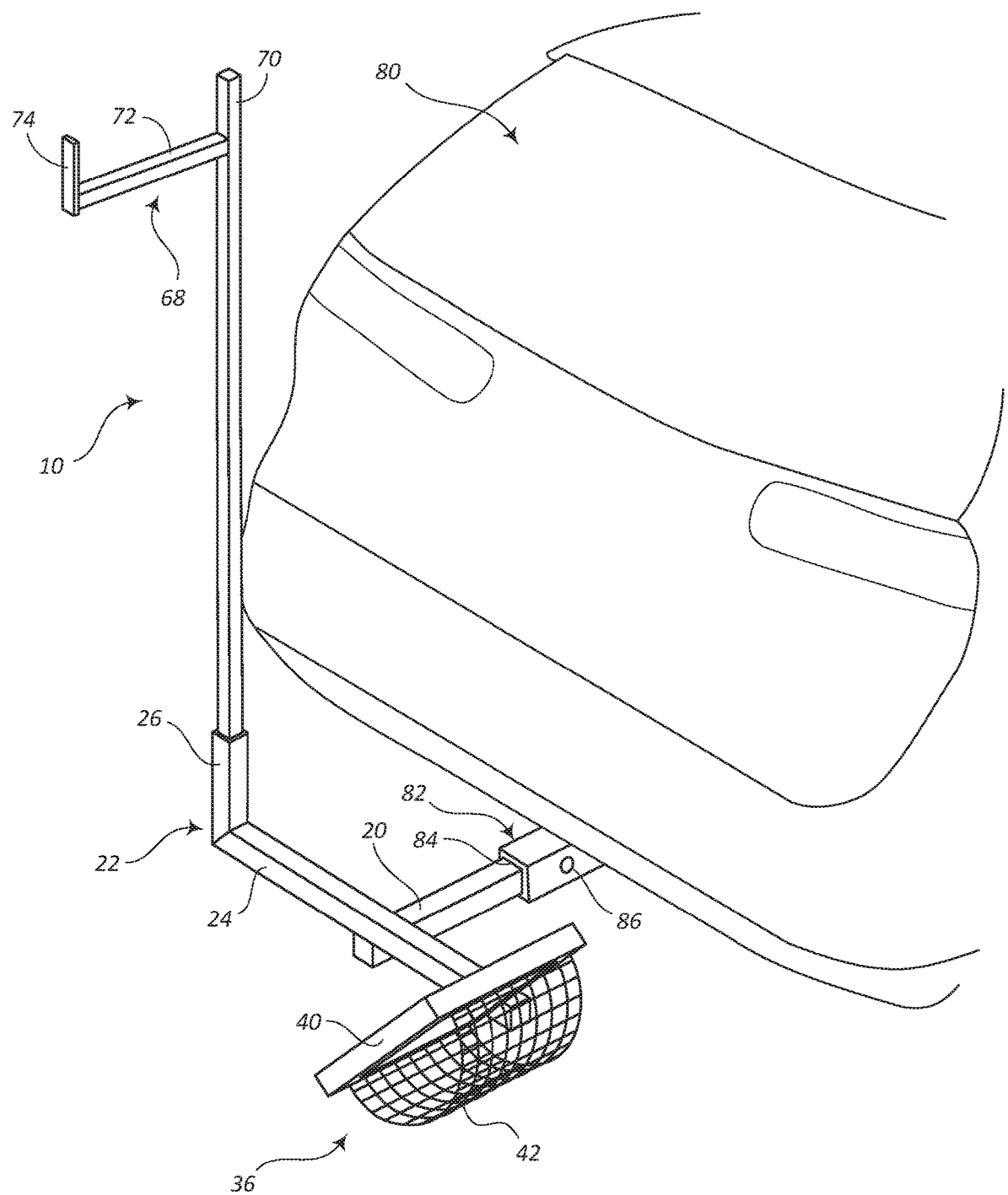
FIG. 5 is a diagram showing a perspective view of the carrier of FIG. 1 attached to a receiver hitch on the back of a vehicle, according to various embodiments of the present disclosure.

FIG. 5 is a diagram showing a perspective view of the carrier 10, described above with respect to FIGS. 1-4. In this illustration, the carrier 10 is attached to the back of a vehicle 80. More particularly, the vehicle 80 may be equipped with a receiver 82 that is securely mounted under a back bumper of the vehicle 80. The receiver 82 may have any suitable design, size, connection configuration, etc. and may be configured for connection with any suitable types of inserts or trailers.

The receiver 82 or receiver hitch may include a receiving port 84, such as a 1½ inch by 1¼ inch opening having a square-shaped cross-section. In the present disclosure, the receiving port 84 may be configured to receive the attachment link 20 of the carrier 10. The vehicle may be equipped with a hitch or receiver with a different size receiving port 84, such as 2 inch by 2 inch (or 2½ inch×2½ inch); in this case, an adapter may be used to connect the attachment link 20 to these larger receiver slots. An opening 86 in the receiver 82 corresponds with the opening 32 in the attachment link 20. Thus, when the attachment link 20 is inserted in the receiving port 84, a pin (not shown), such as a linchpin, may be placed through the receiver 82 and attachment link 20 (i.e., through the openings 86, 32) to hold the attachment link 20 in the receiver 82. Also, a clip (not shown), such as an R-clip, may be connected to the inserted end of the pin to hold the pin through the receiver 82 and attachment link 20.

Figure 6:
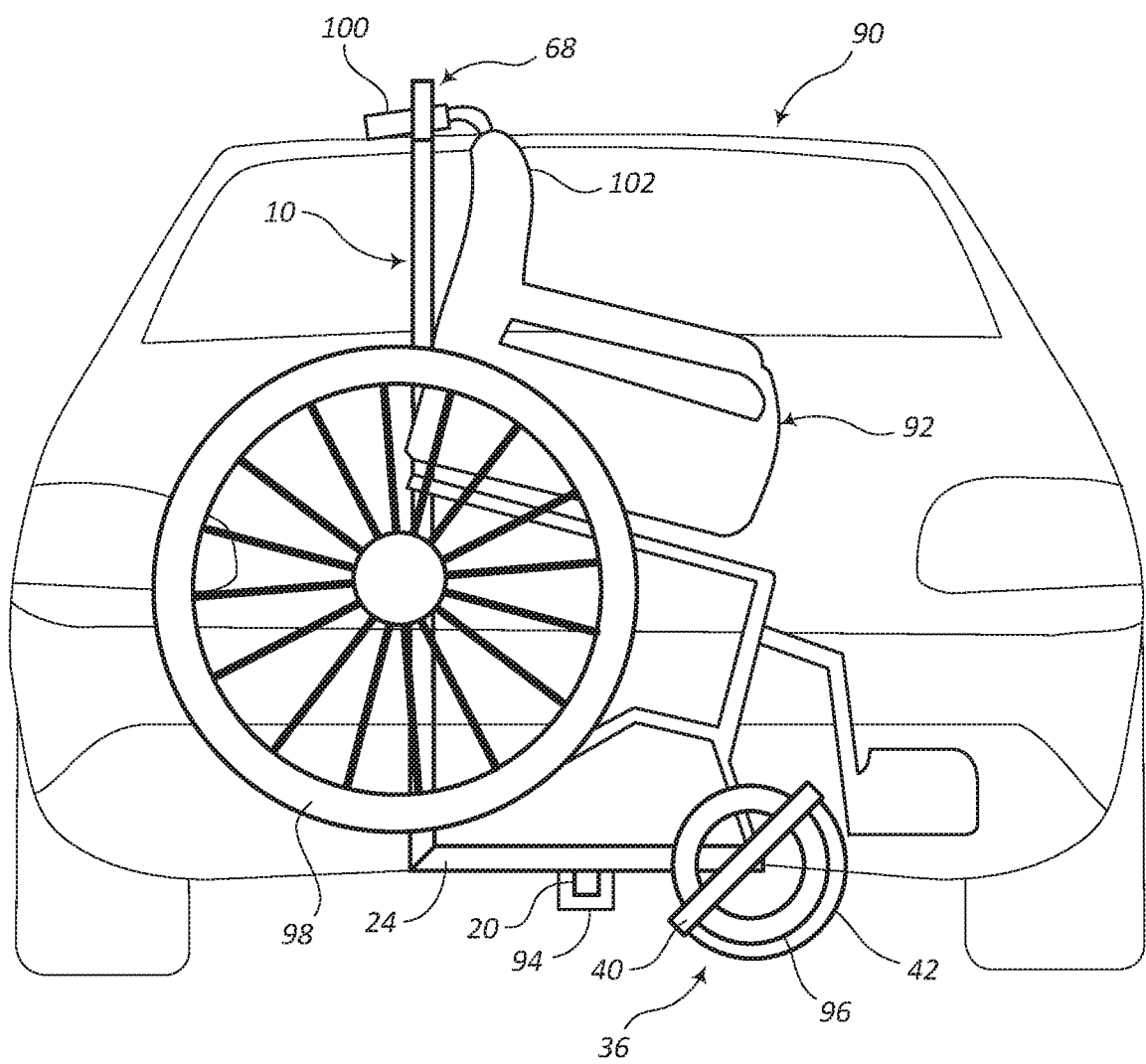
FIG. 6 is a diagram showing a back view of the carrier of FIG. 1 attached to the back of the vehicle and in use for carrying a wheeled mobility device, according to various embodiments of the present disclosure.

FIG. 6 is a diagram showing a back view of the carrier 10 installed on the back of a vehicle 90 according to one embodiment. As shown, the carrier 10 is being used for carrying a wheeled mobility device 92. Once the carrier 10 is installed on the back of the vehicle 90, such as by inserting the attachment link 20 of the carrier 10 into a receiver 94 of the vehicle 90 (e.g., similar to the manner discussed with respect to FIG. 5), the wheeled mobility device 92 may be placed up on the carrier 10. When secured on the carrier 10, the wheeled mobility device 92 can be transported by the vehicle 90.

It may be noticed that the height of the wheeled mobility device 92, when positioned on the carrier 10, may be only a short distance off the ground and hence can be much more easily placed on the carrier 10 when compared to the effort that it would take to lift the wheeled mobility device 92 into the trunk of the vehicle 90. Also, with the carrier 10 installed outside the vehicle 90, the carrier 10 does not occupy any useful trunk space of the vehicle 90.

To place the wheeled mobility device 92 onto the carrier 10, for example, the user may first fold the wheeled mobility device 92 in a side-to-side manner (i.e., side-to-side with respect to the wheeled mobility device 92), such that a front right wheel 96 is adjacent to a front left wheel (blocked from view in FIG. 6) and such that a back right wheel 98 is adjacent to the back left wheel (also blocked from view in FIG. 6).

Once the wheeled mobility device 92 is folded, the user may push down on handles 100 of the wheeled mobility device 92 to tilt the wheeled mobility device 92 back on its rear wheels 98 such that the front wheels 96 are lifted off the ground. This allows the user to lower the front wheels 96 into the basket component 36 of the carrier 10. In this respect, the front wheels 96 are positioned within the frame 40 of the basket component 36 and may rest on the curved mesh component 42. Then, with the front wheels 96 supported by the basket component 36, the user may lift the back end of the wheeled mobility device 92 to pivot the wheeled mobility device 92 about the front wheels 96 and place the handles 100 on the bracket 68 of the carrier 10. The straps 76, 78 may optionally be tied around a portion (e.g., handles 100, back portion 102, etc.) of the wheeled mobility device 92 and then secured together by the hook and loop elements (or other means) for connecting the straps 76, 78 together. Thus, the wheeled mobility device 92 can be easily, yet securely, supported by the carrier 10 for transport by the vehicle 90. Once a final destination is reached, the wheeled mobility device 92 may be removed from the carrier 10 by reversing the actions mentioned above.

Therefore, according to various embodiments of the present disclosure, and particularly in light of the discussion with respect to FIGS. 5 and 6, a hitch assembly is provided. For example, the hitch assembly may include a receiver hitch (e.g., receiver 82 or 94) including at least a receiving slot (e.g., receiving port 84). The receiver 82, 94 may be configured to be securely attached to a vehicle (e.g., vehicle 80, 90). The hitch assembly may further comprise a carrier (e.g., carrier 10) configured to hold a wheeled mobility device (e.g., wheeled mobility device 92) when the vehicle 80, 90 is in motion. Specifically, the carrier 10 may include the attachment link 20 including at least a metal beam, where the metal beam may be configured to be inserted in the receiving slot 84 of the receiver 82, 94 to connect the attachment link 20 to the receiver 82, 94. The carrier 10 may also include the basket component 36 fixedly connected to the attachment link 20 (e.g., via the horizontal part 24 of the base component 22). Furthermore, the carrier 10 may include the upper bracket 68, whereby the basket component 36 and upper bracket 68 are configured to support the wheeled mobility device 92 when the wheeled mobility device 92 is in a collapsed state.

According to additional embodiments, the hitch assembly described above may further comprise a linchpin (not shown) and a clip (not shown) configured to removably connect the attachment link 20 to the receiver 82, 94. The basket component 36 may be configured to support a set of wheels 96 of the wheeled mobility device 92 and the upper bracket 68 may be configured to support a set of handles 100 of the wheeled mobility device 92.

Furthermore, the hitch assembly may also be configured such that the carrier 10 includes the base component 22 having the horizontal part 24 fixedly connected to the vertical part 26, where the horizontal part 24 of the base component 22 may be fixedly connected between the attachment link 20 and the basket component 36. The carrier 10 may also include a telescoping upright post configured to be removably connected between the upper bracket 68 and the vertical part 26 of the base component 22. The upper bracket 68 may include the horizontal prop 72 having a first end connected near the top end 70 of the telescoping upright post and an end component 74 extending in a vertical direction from a second end of the horizontal prop 72.

In some embodiments, the hitch assembly may be further characterized such that the basket component 36 includes the metal frame 40 and the curved mesh component 42. The curved mesh component 42 may have first and second ends connected to opposite sides of the metal frame 40 (e.g., thereby forming a half cylinder shape for accommodating a front set of wheels of the wheeled mobility device 92). The metal frame 40 may define a plane that is oriented at an acute angle with respect to the horizontal part 24 of the base component 22. According to various implementations, the vehicle 80, 90 may include one of a car, pickup truck, van, minivan, SUV, or other type of vehicle. Also, the vehicle 80, 90 may instead be a golf cart, scooter, or other device used for transporting people, which may be larger than the wheeled mobility device and may be too heavy for most people to lift. The wheeled mobility device in some implementations may be a personal transporter or individual transporting device including one of a wheelchair, an electric wheelchair, a walker, a wheeled walker, a transport chair, a rollator, a transport device, or other type of mobility device.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. A carrier configured to carry a wheeled mobility device, the carrier comprising:
    an attachment link configured to be removably connected to a vehicle;
    a base component fixedly connected to the attachment link;
    a basket component fixedly connected to the base component; and
    an upper bracket;
    wherein the basket component and the upper bracket are configured to support the wheeled mobility device, and
    wherein the basket component includes a metal frame and a curved mesh component, the curved mesh component having first and second ends connected to opposite sides of the metal frame.

2. The carrier of claim 1, wherein the basket component and the upper bracket are configured to support the wheeled mobility device when the wheeled mobility device is in a collapsed state.

3. The carrier of claim 2, wherein the basket component is configured to support a set of wheels of the collapsed wheeled mobility device and the upper bracket is configured to support a set of handles of the collapsed wheeled mobility device.

4. The carrier of claim 1, wherein the base component includes a horizontal part fixedly connected to a vertical part, the horizontal part of the base component being fixedly connected between the attachment link and the basket component, and wherein the carrier further comprises an upright post configured to be connected between the upper bracket and the vertical part of the base component.

5. The carrier of claim 4, wherein the upright post includes a lower section connected to an upper section.

6. The carrier of claim 5, wherein the upper section of the upright post is adjustable with respect to the lower section of the upright post, whereby adjusting the upper section results in an adjustment in the position of the upper bracket with respect to the basket component.

7. The carrier of claim 5, wherein the upper bracket includes a horizontal prop having a first end connected near a top end of the upper section of the upright post and an end component extending in a vertical direction from a second end of the horizontal prop.

8. The carrier of claim 7, wherein the upper bracket further includes one or more straps configured to hold a portion of the wheeled mobility device next to the horizontal prop.

9. The carrier of claim 1, wherein the metal frame defines a plane that is oriented at an acute angle with respect to the attachment link.

10. The carrier of claim 1, further comprising a metal connection element fixedly connected between the attachment link and the metal frame of the basket component.

11. The carrier of claim 1, wherein the attachment link includes a metal bar and an opening, wherein the metal bar of the attachment link is configured to be inserted in a receiving slot of a receiver connected to the vehicle.

12. The carrier of claim 1, wherein the vehicle includes one of a car, truck, van, minivan, sport utility vehicle (SUV), golf cart, or scooter.

13. The carrier of claim 1, wherein the wheeled mobility device is a personal transporter including one of a wheelchair, a walker, a wheeled walker, a transport chair, a rollator, or a mobility device.

14. A carrier assembly comprising:
    a receiver hitch securely mounted on a vehicle, the receiver hitch including at least a receiving slot; and
    a carrier configured to be removably connected with the receiver hitch, the carrier configured to hold a wheeled mobility device when the vehicle is in motion, the carrier comprising:

an attachment link including at least a metal bar, the metal bar configured to be inserted in the receiving slot of the receiver hitch to connect the attachment link to the receiver hitch;

a base component fixedly connected to the attachment link;

a basket component fixedly connected to the based component; and an upper bracket;

wherein the basket component and upper bracket are configured to support the wheeled mobility device when the wheeled mobility device is in a collapsed state; and wherein the basket component includes a metal frame and a curved mesh component, the curved mesh component having first and second ends connected to opposite sides of the metal frame, and wherein the metal frame defines a plane that is oriented at an acute angle with respect to the attachment link.

15. The carrier assembly of claim 14, further comprising a linchpin and a clip configured to removably connect the attachment link to the receiver hitch.

16. The carrier assembly of claim 14, wherein the basket component is configured to support a set of wheels of the wheeled mobility device and the upper bracket is configured to support a set of handles of the wheeled mobility device.

17. The carrier assembly of claim 14, wherein the base component includes a horizontal part fixedly connected to a vertical part, the horizontal part of the base component being fixedly connected between the attachment link and the basket component, wherein the carrier further comprises a telescoping upright post configured to be removably connected between the upper bracket and the vertical part of the base component, and wherein the upper bracket includes a horizontal prop having a first end connected near a top end of the telescoping upright post and an end component extending in a vertical direction from a second end of the horizontal prop.

18. The carrier assembly of claim 14, wherein the vehicle includes one of a car, truck, van, minivan, sport utility vehicle (SUV), golf cart, or scooter, and wherein the wheeled mobility device is a personal transporter including one of a wheelchair, a walker, a wheeled walker, a transport chair, a rollator, and a mobility device.

* * * * *